United States Patent
Mao et al.

(10) Patent No.: US 8,468,683 B2
(45) Date of Patent: Jun. 25, 2013

(54) HIGH BEVEL ANGLE MAGNETIC WRITER POLE FABRICATION PROCESS

(75) Inventors: Guomin Mao, San Jose, CA (US); Yi Zheng, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 77 days.

(21) Appl. No.: 13/285,688

(22) Filed: Oct. 31, 2011

(65) Prior Publication Data

US 2013/0104388 A1    May 2, 2013

(51) Int. Cl.
*G11B 5/127* (2006.01)
*H04R 31/00* (2006.01)

(52) U.S. Cl.
USPC .......... 29/603.16; 29/603.13; 29/603.14; 29/603.15; 29/603.18; 205/243; 205/255; 205/257; 205/258; 360/121; 360/122; 360/317

(58) Field of Classification Search
USPC  29/603.07, 603.13–603.16, 603.18; 205/243, 205/255, 257, 258; 360/121, 122, 317
See application file for complete search history.

(56) References Cited

U.S. PATENT DOCUMENTS

| | | | |
|---|---|---|---|
| 7,186,348 B2 | 3/2007 | Chen et al. | |
| 7,296,337 B2 * | 11/2007 | McFadyen | 29/603.16 |
| 7,441,325 B2 | 10/2008 | Gao et al. | |
| 7,444,739 B2 | 11/2008 | Feldbaum et al. | |
| 7,469,467 B2 | 12/2008 | Gao et al. | |
| 7,509,729 B2 | 3/2009 | Allen et al. | |
| 7,549,213 B2 | 6/2009 | Hsu et al. | |
| 7,562,437 B2 | 7/2009 | Pentek et al. | |
| 7,565,732 B2 | 7/2009 | Le et al. | |
| 7,587,810 B2 | 9/2009 | Le | |
| 7,649,712 B2 * | 1/2010 | Le et al. | 360/125.3 |
| 7,712,207 B2 | 5/2010 | Pentek et al. | |
| 7,757,380 B2 * | 7/2010 | Baer et al. | 29/603.16 |
| 7,788,796 B2 * | 9/2010 | Hsiao et al. | 29/603.16 |
| 2009/0168242 A1 | 7/2009 | Liu | |
| 2010/0078316 A1 | 4/2010 | Edakawa et al. | |

FOREIGN PATENT DOCUMENTS

JP    2010-152971    7/2010

* cited by examiner

*Primary Examiner* — Paul D Kim
(74) *Attorney, Agent, or Firm* — Patterson & Sheridan, LLP

(57) ABSTRACT

Methods of making write poles for perpendicular magnetic recording write heads. The bevel angle of the write pole for a perpendicular magnetic recording write head affects the performance of the write head. By forming reinforcement layer on the polymeric underlayer mask to enhance the mask durability during ion mill and tapering the polymeric underlayer above the non-magnetic mill mask layer using oxygen and nitrogen based reactive ion etch process, the bevel angle of the magnetic write pole can be increased greatly to meet the demands of the next and future generations of magnetic recording write heads.

25 Claims, 7 Drawing Sheets

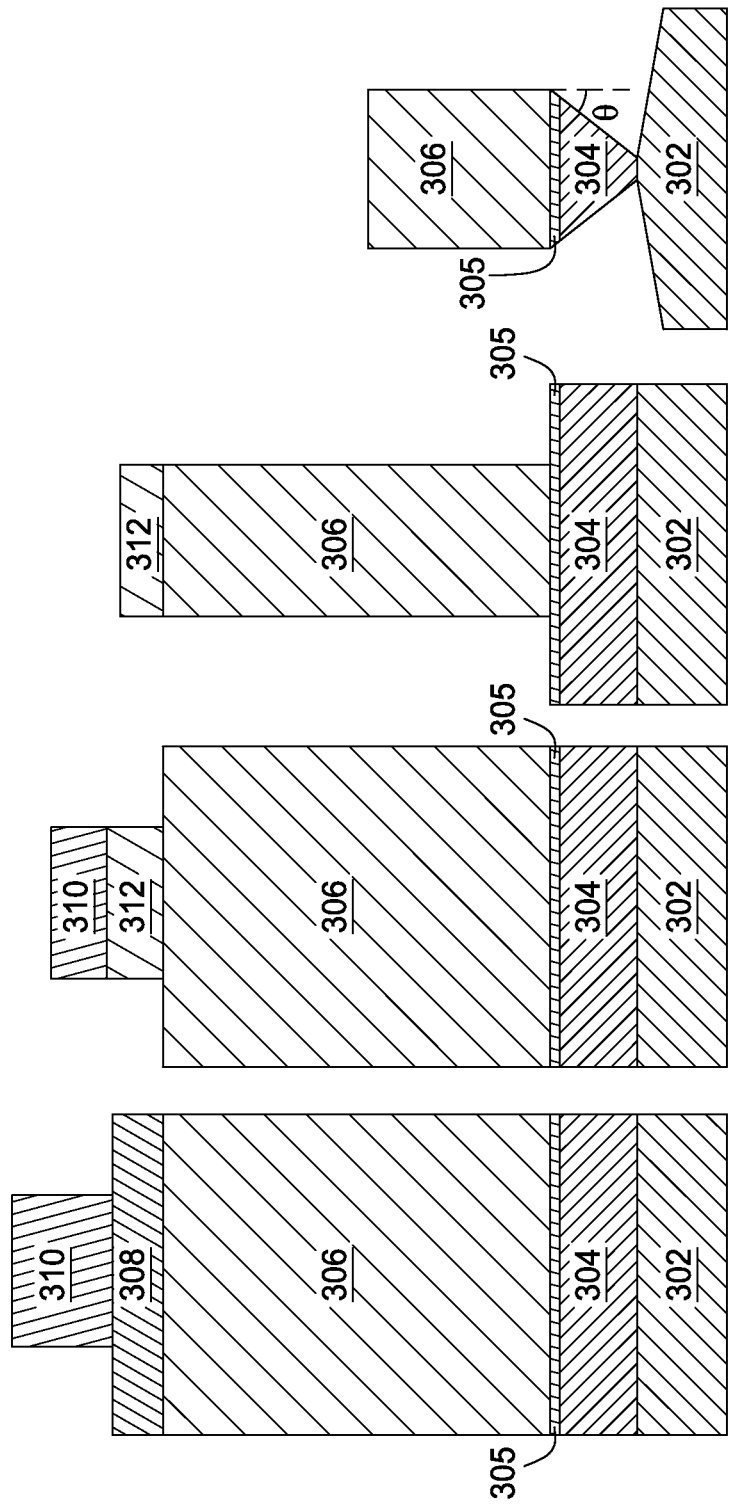

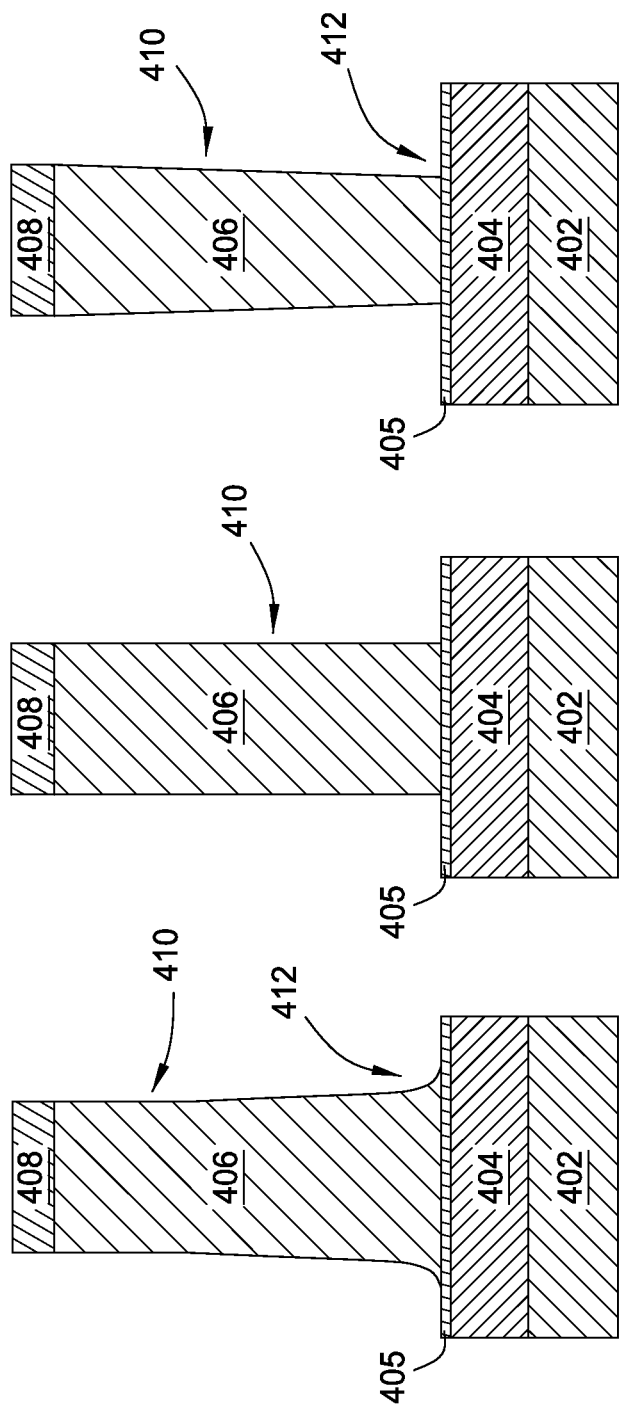

HIGH BEVEL ANGLE MAGNETIC WRITER POLE FABRICATION PROCESS

BACKGROUND OF THE INVENTION

1. Field of the Invention

Embodiments of the present invention generally relate to methods of making write poles for perpendicular magnetic recording write heads.

2. Description of the Related Art

Perpendicular magnetic recording systems are utilized in computer hard disk drives. A typical perpendicular recording write head includes a trailing write pole, a leading return or opposing pole magnetically coupled to the write pole, and an electrically conductive magnetizing coil around the write pole. The magnetic fields of bits of stored information are oriented normal to the plane of the thin film of media, and thus, perpendicular to the direction of a circular data track.

For the magnetic write pole, the width of the pole at the air bearing surface (ABS) affects the areal density. The increasing of areal density benefits mainly by decreasing the width of the magnetic write pole at the ABS. FIGS. 3A-3D exemplify a prior art method of fabricating a narrow width write pole. A layer (or layers) of laminated magnetic materials 304 is deposited over a substrate 302. For simplicity, the laminated structure is shown as a single layer 304. Over the layer of magnetic material 304, a layer (or layers) of non-magnetic film is deposited as an ion mill hard mask 305. For simplicity again, the layers of the non-magnetic film are shown as a single layer 305. A polymeric underlayer 306 is spin coated on the non-magnetic mill hard mask 305, and a dielectric hard mask layer 308 is deposited on the polymeric underlayer. A photoresist mask 310 is then formed over the dielectric layer 308. The dielectric layer 308 is then patterned by a first reactive ion etching (RIE) process using the photoresist mask 310 to form a dielectric hard mask 312. A portion of the photoresist mask is consumed in this first RIE process. The polymeric underlayer 306 is then patterned by a second RIE process using the dielectric hard mask 312 to expose the layer of non-magnetic mill mask layer 305. The photoresist mask is completely consumed during the second RIE process. The patterned polymeric underlayer 306 is then used as a mask for milling the layer of non-magnetic mill mask layer 305 and then magnetic material 304 to bevel the layer of magnetic material 304 to an angle θ from the patterned polymeric underlayer 306 to the substrate 302. An angle θ of up to about 10 degrees can be obtained on a consistent basis with a proper mill process control.

Angles of up to about 10 degrees are acceptable for current generation magnetic write heads. However, higher bevel angles are needed for the next and future generations of magnetic write heads.

SUMMARY OF THE INVENTION

The present invention generally relates to methods of making magnetic write poles for perpendicular magnetic recording write heads. The bevel angle of the write pole for a perpendicular magnetic recording write head affects the performance of the write head. By tapering the polymeric underlayer above the non-magnetic mill mask layers, the bevel angle of the write pole can be increased to meet the demands of the next and future generation of magnetic recording write heads.

In one embodiment, a method of making a write pole of a perpendicular magnetic recording write head includes: depositing a layer of laminated magnetic materials over a substrate, followed with depositing non-magnetic mill mask layers on the magnetic materials, the magnetic material having a desired thickness and composition for the write pole; depositing a polymeric underlayer over the non-magnetic mill mask layer; depositing a dielectric hard mask layer over the polymeric underlayer; forming a photoresist mask over the dielectric hard mask layer such that the photoresist mask covers a first portion of the dielectric hard mask layer and leaves a second portion exposed; removing the exposed second portion of the dielectric hard mask layer such that a portion of the polymeric underlayer is exposed; removing the exposed polymeric underlayer to expose the non-magnetic mill mask layer. The removing of the exposed polymeric underlayer resulting in the polymeric underlayer that remains being tapered from the first portion of the dielectric layer to the layer of magnetic pole material, the removing also resulting in removal of the photoresist mask formed over the dielectric hard mask layer. The subsequent ion mill process removes the exposed portions (not covered by the polymeric underlayer mask) of the layers of both non-magnetic mill mask layer and laminated magnetic pole materials such that the layers of magnetic pole material are tapered from the polymeric underlayer mask remaining to the substrate at an angle from about 10 up to about 15 degrees. Of course, the magnetic write pole with bevel angle lower than 10 degrees can be more easily fabricated by adjusting the ion mill process.

In another embodiment, a method of making a write pole of a perpendicular magnetic recording write head includes: depositing a layer of laminated magnetic pole material over a substrate, followed with depositing a non-magnetic mill mask layer on the magnetic material, the magnetic material having a desired thickness and composition for the write pole; depositing a polymeric underlayer over the non-magnetic mill mask layer; depositing a dielectric hard mask layer over the polymeric underlayer; forming a photoresist mask over the dielectric hard mask layer such that the photoresist mask covers a first portion of the dielectric hard mask layer and leaves a second portion exposed; removing the exposed second portion of the dielectric hard mask layer such that a portion of the polymeric underlayer is exposed; removing the exposed polymeric underlayer to expose the non-magnetic mill mask layer. The removing of the exposed polymeric underlayer resulting in the polymeric underlayer that is tapered from the first portion of the dielectric hard mask layer to the layer of non-magnetic mill mask layer at an angle of between about 0.5 degree to about 1 degrees, the removing also resulting in removal of the photoresist mask formed over the dielectric layer. The subsequent ion mill process removes the exposed portions (not covered by the polymeric underlayer mask) of the layers of both non-magnetic mill mask layer and laminated magnetic pole materials such that the layers of magnetic pole material is tapered from the polymeric underlayer mask remaining to the substrate at an angle from about 10 up to about 15 degrees. Of course, the magnetic write pole with bevel angle lower than 10 degrees can be more easily fabricated by adjusting the ion mill process.

In another embodiment, a method of making a write pole of a perpendicular magnetic recording write head includes: depositing a layer of laminated magnetic pole material over a substrate, followed with depositing non-magnetic mill mask layers on the magnetic material, the magnetic material having a desired thickness and composition for the write pole; depositing a polymeric underlayer over the non-magnetic mill mask layer; depositing a dielectric hard mask layer over the polymeric underlayer; forming a photoresist mask over the dielectric hard mask layer such that the photoresist mask covers a first portion of the dielectric hard mask layer and leaves a second portion exposed; removing the exposed second portion of the dielectric hard mask layer such that a portion of the polymeric underlayer is exposed; removing the exposed polymeric underlayer to expose the non-magnetic mill mask layer. The removing of the exposed polymeric underlayer resulting in the polymeric underlayer that remains being tapered from the first portion of the dielectric layer to the layer of magnetic pole material at an angle of between about 0.5 to about 1 degrees, the removing also resulting in removal of the photoresist mask formed over the dielectric hard mask layer. A reinforcement layer is then deposited over the exposed portions of the layer of non-magnetic mill mask layer, the polymeric underlayer and the dielectric hard mask layer. The materials used to deposit the reinforcement layer can be DLC (diamond like carbon), carbon, PLC (polymer like carbon), alumina, silicon oxide, silicon nitride, silicon carbide, or metals and their alloys such as Ta, TaN and etc, or combinations thereof. The first stage ion mill process is used to mill through the portion of the reinforcement layer (not covered by the polymeric underlayer mask) on the surface of the non-magnetic mill mask layer and expose the non-magnetic mill mask layer, then the continuing ion mill remove the exposed portions of the layers of non-magnetic mill mask layer and expose the magnetic material not covered by the polymeric underlayer mask. The second stage ion mill process is applied to mill the laminated magnetic pole materials such that the layers of magnetic pole material is tapered from the polymeric underlayer remaining to the substrate at an angle from about 15 up to about 25 degrees. Of course, the magnetic write pole with bevel angle lower than 15 degrees can be more easily fabricated by adjusting the ion mill process.

In another embodiment, a method of making a write pole of a perpendicular magnetic recording write head includes: depositing a layer of laminated magnetic pole material over a substrate, followed with depositing non-magnetic mill mask layers on the magnetic material, the magnetic material having a desired thickness and composition for the write pole; depositing a polymeric underlayer over the non-magnetic mill mask layer; depositing a dielectric hard mask layer over the polymeric underlayer; forming a photoresist mask over the dielectric hard mask layer such that the photoresist mask covers a first portion of the dielectric hard mask layer and leaves a second portion exposed; removing the exposed second portion of the dielectric hard mask layer such that a portion of the polymeric underlayer is exposed; removing the exposed polymeric underlayer to expose the non-magnetic mill mask layer. The removing of the exposed polymeric underlayer resulting in the polymeric underlayer that remains being tapered from the first portion of the dielectric layer to the layer of magnetic pole material at an angle of between about 0.5 to about 1 degrees; the removing also resulting in removal of the photoresist mask formed over the dielectric hard mask layer. A reinforcement layer is then deposited over the exposed portions of the layer of non-magnetic mill mask layer, the polymeric underlayer and the dielectric hard mask layer. The materials used to deposit reinforcement layer can be DLC (diamond like carbon), carbon, PLC (polymer like carbon). RIE plasma is used to remove the carbon layer on the surface of the non-magnetic mill mask layer and expose the non-magnetic mill mask layer. The RIE process uses the oxygen containing chemistry such as $O_2$, $CO_2$ and etc. The RIE process can be tuned to selectively remove the carbon film on the top of the dielectric hard mask layer and the carbon film on the top of the surface of the non-magnetic mill mask layer to expose the non-magnetic mill mask layer but leave most of the carbon film on side wall of the polymeric underlayer mask. Then, the ion mill process can be used to remove the exposed portions (not covered by the polymeric underlayer mask) of the layers of both non-magnetic mill mask layer and laminated magnetic pole materials such that the layers of magnetic pole material is tapered from the polymeric underlayer remaining to the substrate at an angle from about 15 up to about 25 degrees. Of course, the magnetic write pole with bevel angle lower than 15 degrees can be more easily fabricated by adjusting the ion mill process.

In another embodiment, a method of making a write pole of a perpendicular magnetic recording write head includes: depositing a layer of laminated magnetic pole material over a substrate, followed with depositing non-magnetic mill mask layers on the magnetic material, the magnetic material having a desired thickness and composition for the write pole; depositing a polymeric underlayer over the non-magnetic mill mask layer material; depositing a dielectric hard mask layer over the polymeric underlayer; forming a photoresist mask over the dielectric hard mask layer such that the photoresist mask covers a first portion of the dielectric hard mask layer and leaves a second portion exposed; removing the exposed second portion of the dielectric hard mask layer such that a portion of the polymeric underlayer is exposed; and removing the exposed polymeric underlayer to expose the non-magnetic mill mask layer. The removing of the exposed polymeric underlayer resulting in the polymeric underlayer that remains being tapered from the first portion of the dielectric layer to the layer of magnetic pole material at an angle of between about 0.5 to about 1 degrees; the removing also resulting in removal of the photoresist mask formed over the dielectric hard mask layer. Depositing a reinforcement layer over the exposed portions of the layer of non-magnetic mill mask layer, the polymeric underlayer and the dielectric hard mask layer. The materials used to deposit reinforcement layer can be DLC (diamond like carbon), carbon, PLC (polymer like carbon), alumina, silicon oxide, silicon nitride, silicon carbide, or metals and their alloys such as Ta, TaN and etc, or combinations thereof. The reinforcement layer on the non-magnetic mill mask layer can be either milled through with ion mill process or directionally etched away by a RIE process. The first stage ion mill process, which removes both the reinforcement layer (not covered by the polymeric underlayer mask) on the surface of the non-magnetic mill mask layer and the non-magnetic mill mask layer, or which only removes the non-magnetic mill mask layer where the RIE process is employed to etch away the reinforcement layer on the non-magnetic mill mask layer, can re-deposit the milled materials on the reinforcement layer located on the side wall of the polymeric underlayer. The re-depositing materials on the reinforcement layer makes the reinforcement layer even thicker and stronger by properly adjusting the ion mill process during removing the exposed portions of the reinforcement layer on the surface of the non-magnetic mill mask layer and non-magnetic mill mask layer to expose the magnetic materials. Then, the second stage ion mill process is applied to mill the laminated magnetic pole materials such that the layers of magnetic pole material is tapered from the polymeric underlayer remaining to the substrate at an angle from about 15 up to about 25 degrees. Of course, the magnetic write pole with bevel angle lower than 15 degrees can be more easily fabricated by adjusting the ion mill process.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3D are schematic cross-sectional views of a prior art write pole at various stages of processing.

FIGS. 4A-4C are schematic cross-sectional views of write poles prior to beveling the layer of magnetic material.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior arts, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention generally relates to methods of making write poles for perpendicular magnetic recording write heads. The bevel angle of the write pole for a perpendicular magnetic recording write head affects the performance of the write head. By a forming reinforcement layer on the polymeric underlayer mask to enhance the mask durability during ion milling and tapering the polymeric underlayer above the non-magnetic mill mask layer using an oxygen and nitrogen based RIE process, the bevel angle of the magnetic write pole can be increased greatly to meet the demands of the next and future generations of magnetic recording write heads.

Figure 1:
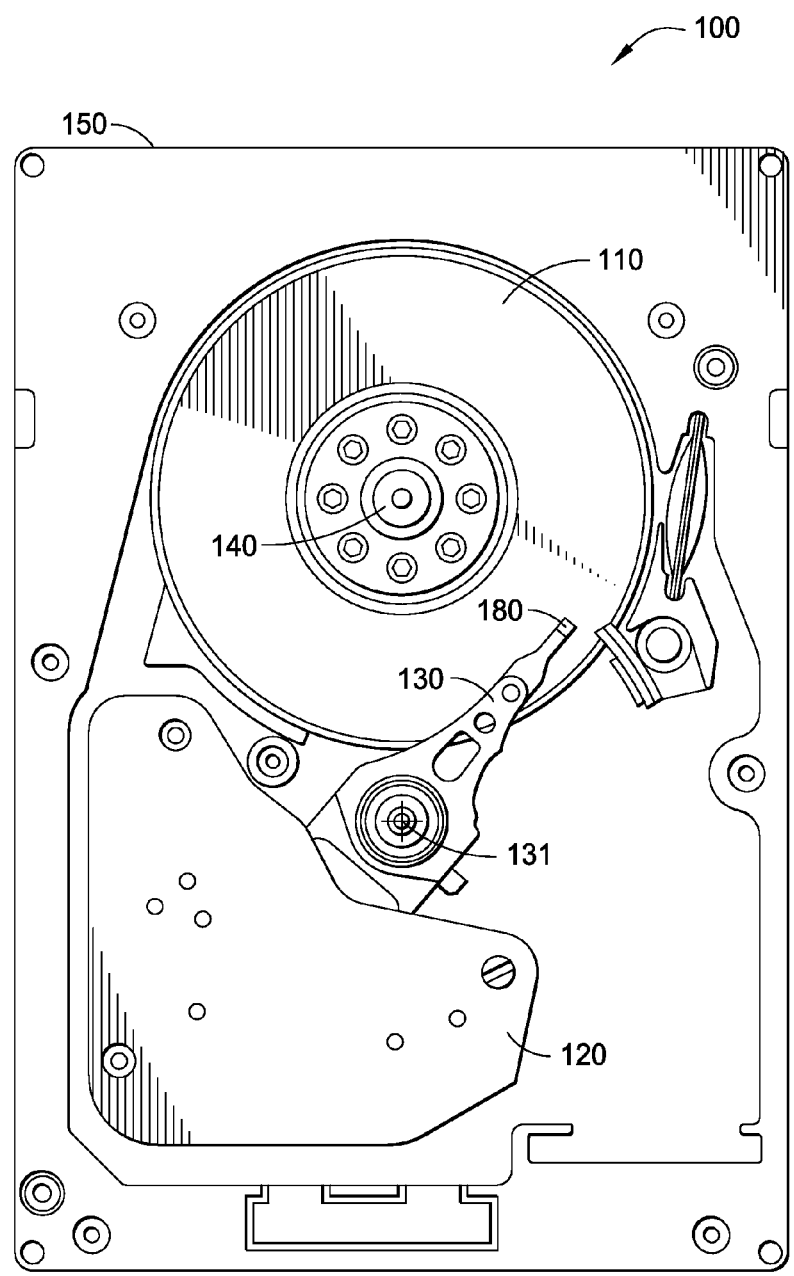
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may include circular tracks of data on both the top and bottom surfaces of the disk. An electromagnetic head 180 may be positioned on a track. As each disk spins, data may be written and/or read from the data track. Electromagnetic head 180 may be coupled to an actuator arm 130 as illustrated in FIG. 1. Actuator arm 130 may be configured to swivel around actuator axis 131 to place electromagnetic head 180 on a particular data track.

A plurality of magnetic disks may be stacked vertically in HDD 100. Each disk may have read and write tracks on each side of the disk. Therefore, electromagnetic heads may be placed on both sides of the disk. In some embodiments, a single magnetic head may be configured to access data tracks on the bottom face of a first disk and a top face of a second disk.

Each actuator arm 130 may be coupled to actuator 120. Actuator 120 may be a motor configured to control the swiveling movement of actuator arm 130 to place electromagnetic head 180 on a given data track. In one embodiment, the actuator arms 130 may be connected. Therefore, all the actuator arms 130, and consequently all the electromagnetic heads 180 may move together.

Spindle motor 140 may be configured to rotate the magnetic disks at a predetermined rate. For example, the spindle motor 140 may be configured to spin at a rate of 10,000 revolutions per minute (rpm). One skilled in the art will recognize however, that any reasonable spin rate may be employed. The spin rate for example may depend on the type of disk drive, the type of computer, etc.

Figure 2A:
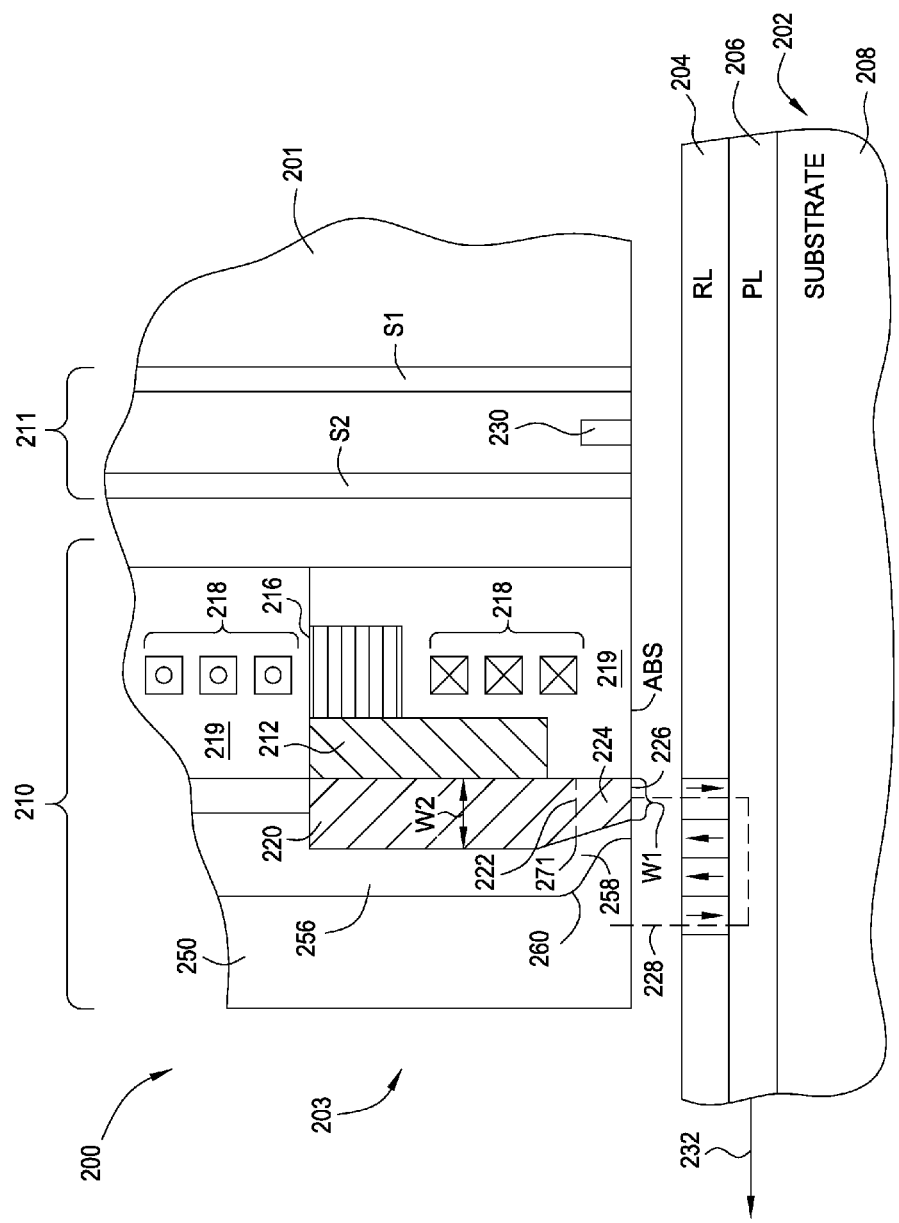
FIG. 2A is a side view of a read/write head and magnetic disk of the disk drive of FIG. 1, according to one embodiment of the invention.

FIG. 2A is a fragmented, cross-sectional side view through the center of an embodiment of a read/write head 200 mounted on a slider 201 and facing magnetic disk 202. The read/write head 200 and magnetic disk 202 may correspond to the electromagnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (PL) 206 formed on a disk substrate 208. The read/write head 200 includes an ABS, a magnetic write head 210 and a magnetic read head 211, and is mounted such that its ABS is facing the magnetic disk 202. In FIG. 2A, the disk 202 moves past the write head 210 in the direction indicated by the arrow 232, so the portion of slider 201 that supports the read/write head 200 is often called the slider "trailing" end 203.

In some embodiments, the magnetic read head 211 is a magnetoresistive (MR) read head that includes an MR sensing element 230 located between MR shields S1 and S2. In other embodiments, the magnetic read head 211 is a magnetic tunneling junction (MTJ) read head that includes an MTJ sensing device 230 located between MR shields S1 and S2. The RL 204 is illustrated with perpendicularly recorded or magnetized regions, with adjacent regions having magnetization directions, as represented by the arrows located in the RL 204. The magnetic fields of the adjacent magnetized regions are detectable by the MR (or MTJ) sensing element 230 as the recorded bits.

The write head 210 includes a magnetic circuit made up of a main pole 212 and a yoke 216. The write head 210 also includes a thin film coil 218 shown in the section embedded in non-magnetic material 219 and wrapped around yoke 216. In an alternative embodiment, the yoke 216 may be omitted, and the coil 218 may wrap around the main pole 212. A write pole 220 is magnetically connected to the main pole 212 and has an end 226 that defines part of the ABS of the magnetic write head 210 facing the outer surface of disk 202.

Figure 2B:
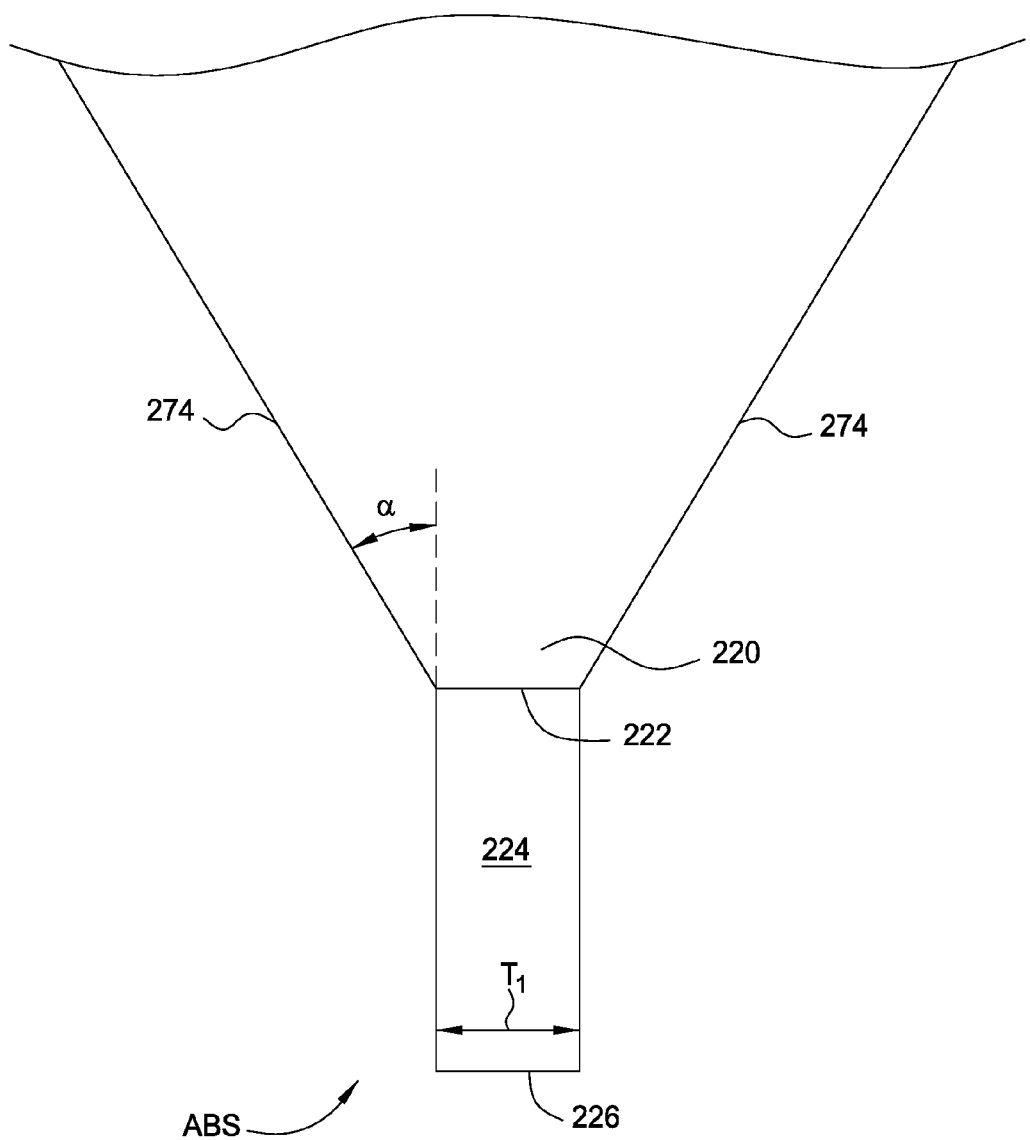
FIG. 2B is an enlarged top view of a portion of the read/write head of FIG. 2A, according to a further embodiment of the invention.

Write pole 220 is a flared write pole and includes a flare point 222 and a pole tip 224 that includes an end 226 that defines part of the ABS. The width of the write pole 220 in a first direction (into and out of the page in FIG. 2A) increases from a first width at the flare point 222 to greater widths away from the ABS, as is shown in FIG. 2B. The flare may extend the entire height of write pole 220 (i.e., from the end 226 of the write pole 220 to the top of the write pole 220), or may only extend from the flare point 222, as shown in FIG. 2A. In one embodiment the distance between the flare point 222 and the ABS is between about 30 nm and about 150 nm.

The write pole 220 includes a tapered surface 271 which increases a width of the write pole 220 from a first width W1 at the ABS to a second width W2 away from the ABS. In one embodiment, the width W1 may be between around 60 nm and 200 nm, and the width W2 may be between around 120 nm and 350 nm. While the tapered region 271 is shown with a single straight surface in FIG. 2A, in alternative embodiment, the tapered region 271 may include a plurality of tapered surface with different taper angles with respect to the ABS. The fabrication of the tapered region 271 is discussed in greater detail below.

The tapering improves magnetic performance. For example, reducing the width W1 at the ABS may concentrate a magnetic field generated by the write pole 220 over desirable portions of the magnetic disk 202. In other words, reducing the width W1 of the write pole 220 at the ABS reduces the probability that tracks adjacent to a desirable track are erroneously altered during writing operations.

While a small width of the write pole 220 is desired at the ABS, it may be desirable to have a greater width of the write pole 220 in areas away from the ABS. A larger width W2 of the write pole 220 away from the ABS may desirably increase the magnetic flux to the write pole 220, by providing a greater thickness of the write pole 220 in a direction generally parallel to the ABS. In operation, write current passes through coil 218 and induces a magnetic field (shown by dashed line 228) from the write pole 220 that passes through the RL 204 (to magnetize the region of the RL 204 beneath the write pole 220), through the flux return path provided by the PL 206, and back to an upper return pole 250. In one embodiment, the greater the magnetic flux of the write pole 220, the greater is the probability of accurately writing to desirable regions of the RL 204.

FIG. 2A further illustrates one embodiment of the upper return pole or magnetic shield 250 that is separated from write pole 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2A is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the write pole 220 and the magnetic shield 250 at the ABS. The shield 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the shield 250.

It should be understood that the taper 260 may extend either more or less than is shown in FIG. 2A. The taper may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a greatest thickness at a second distance (greater than the first distance) from the ABS.

FIG. 2B shows an enlarged top view of the write pole 220 of FIG. 2A, with the shield layer 250 and the gap layer 256 removed to show details of the write pole 220, according to an embodiment of the invention. The write pole 220 includes flared sides 274, which extend from the flare point 222 away from the ABS, such that the main pole increases from a first width $T_1$ to greater widths in a direction away from the ABS.

In some embodiments, the first width, $T_1$ is between 20 nm and 150 nm. The flared sides 274 form an angle α with respect to a plane parallel to the ABS surface. In one embodiment α is between about 30 degrees and about 60 degrees. The flare point 222 may be between about 30 nm and about 275 nm from the ABS.

FIGS. 4A-4C are schematic cross-sectional views of magnetic write poles prior to beveling the layer of magnetic material 404. The write poles comprise a substrate 402 having a layer of magnetic material 404 formed thereover. Suitable materials for the substrate 402 include insulating materials such as alumina. The layer (or layers) of magnetic material 404 that will eventually become the write pole 220 include not only a single layer of magnetic material, but laminates of high-moment magnetic material that include nickel, iron, cobalt and alloys thereof, such as CoFe or NiFe. The layer of magnetic material 404 may be deposited by deposition methods such as sputtering or electroplating.

Over the layer of magnetic material 404, a layer (or layers) of non-magnetic material 405 is deposited such as DLC (diamond like carbon), carbon, PLC (polymer like carbon), alumina, silicon oxide, silicon nitride, silicon carbide, or metals and their alloys such as Ta, TaN and etc. The non-magnetic layer 405 functions as part of the mill mask in addition to the polymeric underlayer mask during the ion mill process of the magnetic material 404, and also prevents damaging or oxidizing the magnetic material 404 during the rework of the polymeric underlayer mask 406 in case that the CD (critical dimension) of the mask and other geometric parameters such as shape factors (for example, the ratio of top CD to bottom CD of the polymeric underlayer mask) are out of the production specification and the substrates are forced to a re-work loop in which plasma ash and wet strip are employed to remove the polymeric underlayer mask but have no damage to the non-magnetic mill mask layer which is not sensitive to the plasma ash and wet strip processes. A polymeric underlayer is deposited after the formation of the non-magnetic mill mask layer 405. The suitable polymeric underlayer material that may be utilized are polymeric materials that can be cured at a relatively low temperature, such as around 150 to 250 degrees Celsius. The examples of such polymeric materials include SIUL (Shin-Etsu Chemical Co., Ltd.), DURIMIDE (Fujifilm Corporation), JSR HM8006 (Honeywell International Inc.), ACCUFLO T-31 (Honeywell International Inc.) or etc. However, it should be understood that other polymeric materials may be utilized as well as long as they are suitable and fit to the requirements of the ion mill process.

A dielectric hard mask layer is deposited over the polymeric underlayer. The dielectric hard mask layer can be constructed of a dielectric material and is preferably constructed of a silicon containing materials such as silicon oxide, silicon nitride, silicon oxynitride or a silicon containing organic material such as SIHM (Shin-Etsu Chemical Co., Ltd.), UVAS (Honeywell International Inc.) and etc. The thickness of the dielectric hard mask layer depends on the thickness of the polymeric underlayer and the etch rate selectivity of the dielectric hard mask layer to polymeric underlayer in the second RIE process to transfer the mask pattern of the dielectric hard mask layer onto the polymeric underlayer. Generally, the thicker the under-layer, the thicker the dielectric hard mask layer will have to be. An optional bottom anti-reflective coating (BARC) may be applied over the dielectric hard mask layer. The determination of whether a BARC layer is needed depends on the requirements of the photolithographic process and on the material used for the first RIE on the dielectric hard mask layer. For example, if the dielectric hard mask layer is a material that can act as a BARC, then no BARC layer is needed. Such materials for the BARC include silicon oxynitride, SIHM (Shin-Etsu Chemical Co., Ltd.), UVAS (Honeywell International Inc.). Also, no BARC is needed if the dielectric hard mask layer is sufficiently thin and the critical dimensions of the magnetic pole are large enough that the polymeric underlayer 406 can function as a BARC. However, some form of BARC is desirable to control photolithography parameters such as reflective swing and photo critical dimensions, in this case, for simplicity, the dielectric layer and BARC layer are collectively shown as one layer in the drawings and referred to as dielectric hard mask layer.

A photoresist mask is then formed over the dielectric hard mask layer to cover a first portion of the dielectric hard mask layer and leave a second portion of the dielectric hard mask layer exposed. The dielectric hard mask layer is then patterned by a RIE process to form a hard mask 408. The hard mask 408 is formed by performing a RIE process utilizing a fluorocarbon based chemistry that utilizes a fluorine containing gas such as $CF_4$, $CHF_3$ or a combination of the two together with an inert gas such as argon. The RIE process comprises removing the exposed second portion of the dielectric hard mask layer such that a portion of the polymeric underlayer is exposed and the dielectric hard mask 408 is formed.

The polymeric underlayer is then patterned by another RIE process. The polymeric underlayer mask 406 is formed by performing a RIE process utilizing an oxygen containing plasma. The RIE process comprises removing the exposed second portion of the polymeric underlayer such that a portion of the non-magnetic mill mask layer 405 is exposed and the polymeric underlayer mask 406 is formed. The polymeric underlayer mask 406 is used as a mask for milling both non-magnetic material 405 and magnetic material 404 to form the write pole 220. The dimension and geometric profile of the polymeric underlayer mask 406 is thus important to control the ion milling pole formation. Flared out walls 410 or straight walls 410 for the polymeric underlayer 406 are sufficient for beveling the write pole 220 to angles of up to about 10 degrees, but in order to exceed 10 degrees consistently, tapered walls 410 are needed.

As shown in FIG. 4A, the RIE process may lead to walls 410 of the polymeric underlayer mask 406 that flare out at adjacent the interface 412 with the layer of non-magnetic mill mask layer 405 such that footing is present. The polymeric underlayer mask 406 shown in FIG. 4A is not desirable because it is very hard for ion mill process to form the magnetic write pole with bevel angle over 10 with the existence of the footing and it is also too difficult to control the footing size (such as foot height, foot length, the profile of the incline side) from site to site within a wafer as well as from wafer to wafer that the final write pole 220 critical dimension (CD) and the bevel angle will not be easily controlled in desired specification.

As shown in FIG. 4B, the walls 410 of the polymeric underlayer mask 406 may be generally straight such that the polymeric underlayer mask 406 has a rectangular cross section profile. The bevel angle for the write pole 220 can be controlled well up to an angle of 10 degrees and the CD for the write pole 220 can also be controlled in specification.

As shown in FIG. 4C, the walls 410 of the polymeric underlayer mask 406 may taper in towards the interface 412 with the layer of non-magnetic mill mask layer 405. The polymeric underlayer mask 406 has a slightly trapezoid profile (i.e. greater top CD and smaller bottom CD) and is most favorable for an ion milling mask to achieve a consistent CD and profile control of the write pole 220 and to form a higher bevel angle of 10 degrees or more. It is easy to fabricate a write pole with bevel angle up to about 15 degree with the tapered polymeric underlayer mask 406. The RIE process to form the tapered walls 410 comprises removing the exposed polymeric underlayer to expose the layer of non-magnetic mill mask layer 405. The removing the exposed polymeric underlayer results in the polymeric underlayer that remains being tapered from the first portion of the dielectric layer (i.e., the hard mask 408) to the layer of non-magnetic mill mask layer 405. The removing also results in removal of the photoresist mask formed over the dielectric hard mask 408.

For the flared or straight walls 410 shown in FIGS. 4A and 4B, the RIE process is an oxygen based chemistry utilizing a gas such as $CO_2$, $O_2$ or a combination thereof. In order to taper the walls 410 as shown in FIG. 4C, nitrogen may be added to the gas mixture. The relative ratio of the oxygen containing gas to the nitrogen gas can be tuned to ensure the polymeric underlayer 406 is etched to produce the tapered walls 410. The ratio can be between 15:1 to 1.5:1. The method of fabricating the tapered walls 410 as shown in FIG. 4C is discussed in U.S. patent application Ser. No. 13/251,058, filed Sep. 30, 2011, which is incorporated herein by reference.

Figure 5C:
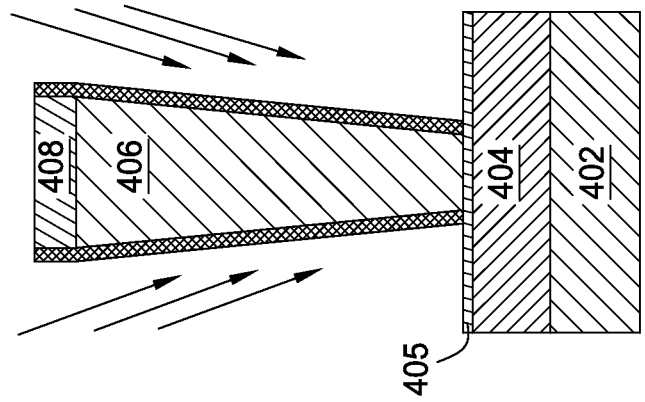
FIGS. 5A-5D are schematic cross-sectional views of the write pole at various stages of production.
Figure 5B:
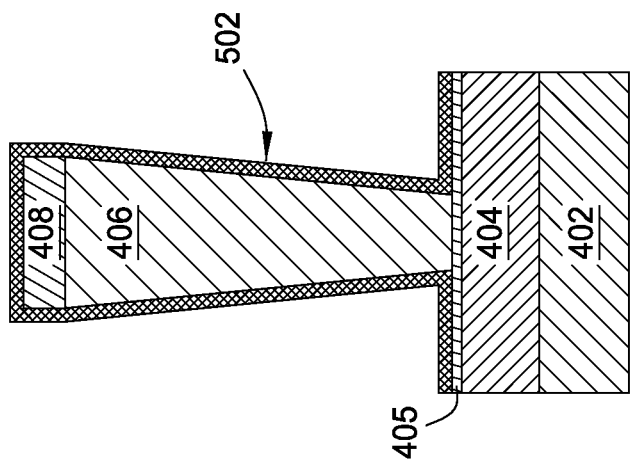
Figure 5A:
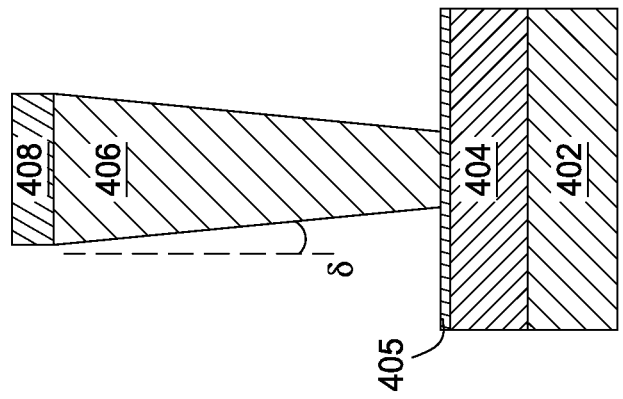
Figure 5D:
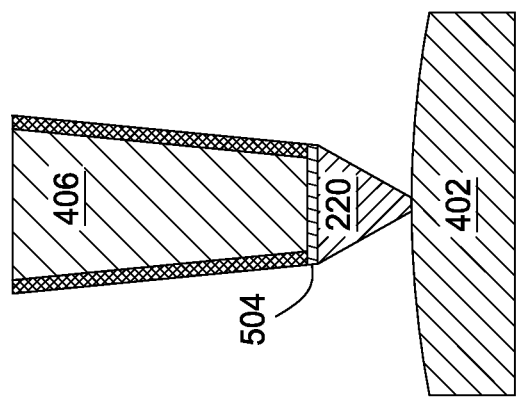

FIGS. 5A-5D are schematic cross-sectional views of the write pole 220 at various stages of fabrication. As shown in FIG. 5A, the polymeric underlayer mask 406 is tapered at an angle δ, which is between about 0.5 degree and about 1 degree, following the RIE process. As shown in FIG. 5B, a thin reinforcement layer 502 of ion milling resistant material, such as DLC (diamond like carbon), carbon, PLC (polymer like carbon), alumina, silicon oxide, silicon nitride, silicon carbide, or metals and their alloys such as Ta, TaN and etc. or combinations thereof, is deposited over the exposed layer of non-magnetic mill mask layer 405, the polymeric underlayer mask 406 and the dielectric hard mask 408. The layer 502 is deposited to a thickness of between about 5 nm to about 30 nm, such as about 15 nm. The reinforcement layer 502 is beneficial to the fabrication of the write pole 220.

For next generation and future advanced magnetic write head, due to the already small photoresist mask CD such as less than 150 nm and the tapering of the polymeric underlayer mask 406, the polymeric underlayer mask 406 may have too small bottom CD to support its weight (including dielectric hard mask 408) during ion mill process. The relatively soft mechanical strength of the polymeric underlayer material compared with that of the regular metals (or glass such as silicon oxide or ceramics such as silicon carbide) may not sufficient to sustain itself during ion mill process (especially the large angle ion mill that would intensively attacks the side wall of the polymeric underlayer and make it even more venerable) that the side wall 502 of the polymeric underlayer may be distorted or even collapse. The reinforcement layer 502, which is deposited onto the polymeric underlayer mask 406 before the ion mill process, serves to anchor the polymeric underlayer mask 406 and hard mask 408 to the layer of non-magnetic material 405 for the ion milling process.

After the initial ion mill process which mills through the reinforcement layer 502 on the surface of the non-magnetic mill mask layer 405 to form the non-magnetic mill mask 504 with sufficient over mill amount to completely exposed the magnetic pole layer 404, the ion milling process begins to bevel the layer of magnetic material 404 using different mill mode from the initial milling on the non-magnetic mill mask layer, as shown in FIG. 5C. The ion milling process utilizes argon ions and is operated with several modes to optimize the mill process and get desired magnetic write pole shape factors including the bevel angle and the CD. During the ion milling process, the ions are directed at an angle towards the layer of magnetic material 404. The angle at which the ions are directed is selected based upon the desired bevel angle and generally corresponds to the desired bevel angle. As such, the reinforcement layer 502 on the top surface of the dielectric hard mark 408 together with dielectric hard mask 408 is removed. The polymeric underlayer mask 406 is also shortened by the ion mill. The reinforcement layer 502 on the side wall of the polymeric underlayer mask 406 is partially or completely consumed depending on the initial deposition thickness of the reinforcement layer and the amount of the re-deposition from the ion mill process. Because of the tapered walls 410, the ion milling is able to mill the layer of magnetic material 404 to form a write pole 220 that is beveled at an angle of greater than about 15 degrees, and even up to or beyond 20 degree, from the polymeric underlayer mask 406 to the substrate 402. Of course, the magnetic write pole 220 with a bevel angle lower than 15 degree can be more easily fabricated using the same polymeric underlayer mask anchored by reinforcement layer by adjusting the ion mill process.

The reinforcement layer 502 does not only anchor and support the polymeric mask during ion mill process, but also functions as a mill mask too because the materials that are selected as the reinforcement layer 502 have a relatively lower mill rate compared to that of the polymeric underlayer mask 406 that the side wall consumption of the polymeric underlayer mask 406 is greatly reduced. Conventionally, to obtain bevel angle more than about 10 degree, the large angle and strong ion beam must be used to bevel the magnetic layer more that it consumes more underlayer mask on the side wall. Especially for bevel angle more than about 15, the ion beam angle will be even larger, mill time of this large-angle mill would be longer and strength of the large-angle mill would be stronger that there are much more side wall consumption on the polymeric underlayer mask and it may not sustain to the final stage of the mill and collapsed if there is no reinforcement layer to support the polymeric underlayer mask during this harsh ion mill process. One possible way to resolve this issue for bevel angle less than about 15 degree is to widen the polymeric underlayer mask that its CD width is wide enough that it can still stand after the ion mill. However, for even higher bevel angle such as greater than about 15 degree, this method have other issues, with the much wider polymeric mask CD width, the much greater side-wall directional ion mill may bring too much horizontal mill that the side wall of the polymeric underlayer would be reduced too much to get the final magnetic head CD controlled in specification and this for sure creates a serious yield issue.

Therefore, to resolve the problem, the reinforcement layer 502 is deposited onto the polymeric underlayer mask 406 having a relatively small CD width. The materials of the reinforcement layer 502 are selected from DLC (diamond like carbon), amorphous carbon, PLC (polymer like carbon), alumina, silicon oxide, silicon nitride, silicon carbide, or metals and their alloys such as Ta, TaN and etc, or combinations thereof, which all have better mechanical strength and a lower ion mill rate compared to polymeric underlayer mask 406. Thus, consumption of the reinforcement layer 502 will be much slower so that a large-angle ion mill process can be used to bevel the magnetic layer 404 to a much higher angle value such as more than 15 degrees or beyond 20 degrees. With proper selection of the reinforcement material and thickness, together with optimization of the large-angle ion mill process, it is possible to bevel the magnetic layer 404 to even higher angles such as more than 25 degrees.

The ion mill process may start with an initial ion mill process which is used to mill through reinforcement layer on the non-magnetic mill mask and the non-magnetic mill mask layer 405. The process can be well controlled by the endpoint with a certain amount of over milling to ensure the magnetic layer 404 is exposed to the next mill processes which bevel the magnetic layer to a high angle. The initial ion mill process can be tuned so that it may produce re-deposition on the surface of the remaining reinforcement layer 502 while punching through the reinforcement layer 502. The re-deposition layer is formed from the initial milling process and provides extra layers to the reinforcement layer 502 and makes the reinforcement layer 502 even thicker and tougher for the later high-bevel angle mill process. Thus the re-deposition helps to obtain higher bevel angle magnetic write pole 220.

If the reinforcement layer 502 is carbon based materials such as DLC (diamond like carbon), amorphous carbon, or PLC (polymer like carbon), a RIE process can be used to directionally remove the reinforcement layer 502 on the surface of the non-magnetic mill mask layer 405. The RIE uses the oxygen containing plasma chemistry such as $O_2$ and $CO_2$ mixed with inert gas such as argon. Since the RIE etch can be tuned anisotropically so that the motions of the ions are mostly vertical and normal toward the substrate surface, the RIE plasma would mostly etch the carbon films on the surface of the non-magnetic mill mask layer 405 but result in much less etching of the carbon film deposited on the side wall of the polymeric underlayer mask 406. Of course, the carbon film on the top of the dielectric hard mask is removed. With a carefully controlled RIE process, there should be enough carbon left over on the side wall of the polymeric underlayer mask 406.

Then the initial ion mill process can be used to mill through the non-magnetic mill mask layer 405. Again, the process can be well controlled by the endpoint with certain amount of over milling to ensure the magnetic layer 404 is exposed to the next mill processes which bevels the magnetic layer 404 to a high angle.

In summary, by tapering the walls of the polymeric underlayer mask formed over the layer of magnetic material, higher bevel angles for the write pole may be obtained consistently. Additionally, a reinforcement layer deposited over the structure prior to ion milling the layer of magnetic material ensures the polymeric underlayer mask does not collapse and makes it possible to obtain bevel-angle more than 15 degree or even beyond 20 degree.

While the foregoing is directed to embodiments of the present invention, other and further embodiments of the invention may be devised without departing from the basic scope thereof, and the scope thereof is determined by the claims that follow.

What is claimed is:

1. A method of making a write pole for a perpendicular magnetic recording write head, comprising:

depositing a layer of magnetic material over a substrate, the magnetic material having a desired thickness and composition for the write pole;

depositing a layer of non-magnetic material over the layer of magnetic material;

depositing a polymeric underlayer over the layer of non-magnetic material;

depositing a dielectric hard mask layer over the polymeric underlayer;

forming a photoresist mask over the dielectric hard mask layer such that the photoresist mask covers a first portion of the dielectric hard mask layer and leaves a second portion exposed;

removing the exposed second portion of the dielectric hard mask layer such that a portion of the polymeric underlayer is exposed and a dielectric hard mask is formed;

removing the exposed polymeric underlayer to expose the layer of non-magnetic material and to form a polymeric underlayer mask that is tapered from the dielectric hard mask to the layer of non-magnetic material, the removing also resulting in removal of the photoresist mask formed over the dielectric hard mask;

removing the exposed portions of the layer of non-magnetic material to expose the layer of magnetic material; and removing exposed portions of the layer of magnetic material to form a write pole that is tapered from the polymeric underlayer mask to the substrate at an angle of greater than 10 degrees and up to 20 degrees.

2. The method of claim 1, wherein the removing the exposed second portions of the dielectric hard mask layer comprises performing a reactive ion etching process.

3. The method of claim 2, wherein the reactive ion etching process is performed with a fluorocarbon based chemistry.

4. The method of claim 3, wherein the fluorocarbon based chemistry utilizes a fluorine containing gas selected from the group consisting of $CF_4$, $CHF_3$ and combinations thereof.

5. The method of claim 1, wherein removing the exposed polymeric underlayer comprises performing a reactive ion etching process.

6. The method of claim 5, wherein the reactive ion etching process is performed utilizing an oxygen based chemistry.

7. The method of claim 6, wherein the oxygen based chemistry utilizes $CO_2$ and $N_2$ gases.

8. The method of claim 1, wherein removing exposed portions of the layer of non-magnetic material and removing the exposed portions of the layer of magnetic material comprises ion milling.

9. The method of claim 8, wherein the ion milling is performed with argon ions.

10. The method of claim 1, further comprising depositing a reinforcement layer over the exposed portions of the layer of non-magnetic material, the polymeric underlayer mask and the dielectric hard mask prior to removing exposed portions of the layer of non-magnetic material.

11. The method of claim 10, wherein the reinforcement layer is selected from the group consisting of diamond like carbon, carbon, polymer like carbon, alumina, silicon oxide, silicon nitride, silicon carbide, metals and their alloys, or combinations thereof.

12. The method of claim 11, wherein portions of the reinforcement layer remain on the polymeric underlayer mask after removing exposed portions of the layer of magnetic material.

13. The method of claim 1, wherein the polymeric underlayer mask that is tapered from the dielectric hard mask to the layer of non-magnetic material at an angle of between about 0.5 degrees to about 1.0 degrees.

14. A method of making a write pole for a perpendicular magnetic recording write head, comprising:

depositing a layer of magnetic material over a substrate, the magnetic material having a desired thickness and composition for the write pole;

depositing a layer of non-magnetic material over the layer of magnetic material;

depositing a polymeric underlayer over the layer of non-magnetic material;

depositing a dielectric hard mask layer over the polymeric underlayer;

forming a photoresist mask over the dielectric hard mask layer such that the photoresist mask covers a first portion of the dielectric hard mask layer and leaves a second portion exposed;

removing the exposed second portion of the dielectric hard mask layer such that a portion of the polymeric underlayer is exposed and a dielectric hard mask is formed;

removing the exposed polymeric underlayer to expose the layer of non-magnetic material and to form a polymeric underlayer mask that is tapered from the dielectric hard mask to the layer of non-magnetic material at an angle of between about 0.5 degrees to about 1.0 degrees, the removing also resulting in removal of the photoresist mask formed over the dielectric hard mask;

depositing a reinforcement layer over the exposed portions of the layer of non-magnetic material, the polymeric underlayer mask and the dielectric hard mask;

removing portions of the reinforcement layer that are on the surface of the layer of non-magnetic material to expose the layer non-magnetic material;

removing the exposed layer of non-magnetic material to expose the layer of magnetic material; and removing exposed portions of the layer of magnetic material to form a write pole that is tapered from the polymeric underlayer mask to the substrate at an angle of greater than 10 degrees and up to 20 degrees.

15. The method of claim 14, wherein the removing the exposed second portion of the dielectric hard mask layer comprises performing a reactive ion etching process with a fluorine containing gas selected from the group consisting of $CF_4$, $CHF_3$ and combinations thereof.

16. The method of claim 14, wherein removing the exposed polymeric underlayer comprises performing a reactive ion etching process utilizing $CO_2$ and $N_2$ gases and wherein removing exposed portion of the layer of non-magnetic material and removing the exposed portion of the layer of magnetic material comprises ion milling.

17. The method of claim 14, wherein removing exposed portions of the layer of non-magnetic material and removing exposed portions of the layer of magnetic material comprises ion milling with argon ions.

18. The method of claim 14, further comprising depositing a reinforcement layer over the exposed portions of the layer of non-magnetic material, the polymeric underlayer mask and the dielectric hard mask prior to removing exposed portions of the layers of non-magnetic material.

19. The method of claim 18, wherein the reinforcement layer is selected from the group consisting of diamond like carbon, carbon, polymer like carbon, or combinations thereof.

20. The method of claim 19, wherein the portion of the reinforcement layer on the surface of the layer non-magnetic material is removed using a RIE process utilizing an oxygen containing plasma chemistry.

21. The method of claim 20, wherein the oxygen containing plasma chemistry comprises $O_2$, $CO_2$ or combinations thereof with inert gas.

22. The method of claim 19, wherein portions of the reinforcement layer remain on the polymeric underlayer mask after removing the exposed portions of the layer of magnetic material.

23. A method of making a write pole for a perpendicular magnetic recording write head, comprising:
- depositing a layer of magnetic material over a substrate, the magnetic material having a desired thickness and composition for the write pole;
- depositing a layer of non-magnetic material over the layer of magnetic material;
- depositing a polymeric underlayer over the layer of non-magnetic material;
- depositing a dielectric hard mask layer over the polymeric underlayer;
- forming a photoresist mask over the dielectric hard mask layer such that the photoresist mask covers a first portion of the dielectric hard mask layer and leaves a second portion exposed;
- removing the exposed second portion of the dielectric hard mask layer such that a portion of the polymeric underlayer is exposed and a dielectric hard mask is formed;
- removing the exposed polymeric underlayer to expose the layer of non-magnetic material, and to form a polymeric underlayer mask that is tapered from the dielectric hard mask to the layer of non-magnetic material at an angle of between about 0.5 degrees to about 1.0 degrees, the removing also resulting in removal of the photoresist mask formed over the dielectric hard mask; and
- depositing a reinforcement layer over the exposed portions of the layer of non-magnetic material, the polymeric underlayer mask and the dielectric hard mask;
- removing portions of the reinforcement layer and re-depositing the removed portions on remaining portions of the reinforcement layer to increase the thickness of the remaining portions of the reinforcement layer and to expose the layer of non-magnetic material;
- removing the exposed layer of non-magnetic material to expose portions of the layer of magnetic material; and
- removing exposed portions of the layer of magnetic material to form a write pole that is tapered from the polymeric underlayer mask to the substrate at an angle of greater than 15 degrees.

24. The method of claim 23, wherein the removing the exposed second portion of the dielectric hard mask layer comprises performing a reactive ion etching process with a fluorine containing gas selected from the group consisting of $CF_4$, $CHF_3$ and combinations thereof and wherein removing the exposed polymeric underlayer comprises performing a reactive ion etching process utilizing $CO_2$ and $N_2$ gases.

25. The method of claim 23, wherein removing the portions of the reinforcement layer, removing the exposed layer of non-magnetic material and removing the exposed layer of magnetic material comprises ion milling with argon ions, wherein the reinforcement layer is selected from the group consisting of an atomic layer deposited layer, diamond like carbon, carbon, polymer like carbon, silicon carbide, silicon oxide, silicon nitride, metals or combinations thereof, and wherein the portions of the reinforcement layer remain on the polymeric underlayer mask after removing the exposed portions of the layer of magnetic material.

* * * * *